(12) United States Patent
Huang et al.

(10) Patent No.: US 11,314,569 B2
(45) Date of Patent: Apr. 26, 2022

(54) REDUNDANT PROCESSING NODE CHANGING METHOD AND PROCESSOR CAPABLE OF CHANGING REDUNDANT PROCESSING NODE

(71) Applicant: INDUSTRIAL TECHNOLOGY RESEARCH INSTITUTE, Hsinchu (TW)

(72) Inventors: Li-Ren Huang, Zhubei (TW); Chi-Chun Hsu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 59 days.

(21) Appl. No.: 16/729,288

(22) Filed: Dec. 27, 2019

(65) Prior Publication Data
US 2021/0173732 A1 Jun. 10, 2021

(30) Foreign Application Priority Data

Dec. 4, 2019 (TW) .................................. 108144325

(51) Int. Cl.
*G06F 11/00* (2006.01)
*G06F 11/07* (2006.01)

(52) U.S. Cl.
CPC ...... *G06F 11/0751* (2013.01); *G06F 11/0724* (2013.01); *G06F 11/0772* (2013.01)

(58) Field of Classification Search
CPC .. G06F 11/1641; G06F 11/2028; G06F 11/30; G06F 11/1629; G06F 11/202; G06F 11/2242
See application file for complete search history.

(56) References Cited

U.S. PATENT DOCUMENTS 5,742,753 A 4/1998 Nordsieck et al.
5,857,113 A 1/1999 Henderson et al.
(Continued)

FOREIGN PATENT DOCUMENTS

CN 108146250 A 6/2018
TW 576975 B 2/2004
(Continued)

OTHER PUBLICATIONS

Salloum et al. "The ACROSS MPSoC—A new generation of multi-core processors designed for safety-critical embedded systems" Sep. 2013.
(Continued)

*Primary Examiner* — Charles Ehne
(74) *Attorney, Agent, or Firm* — Maschoff Brennan

(57) ABSTRACT

A processor capable of changing redundant processing node comprises a plurality of processing nodes and a plurality of comparators. The plurality of processing nodes comprises a first processing node, a second processing node, and a third processing node, wherein the first processing node performs a first computation, the second processing node selectively performs the first computation or a second computation, and the third processing node performs the second computation. The plurality of comparators comprises a first comparator and a second comparator, wherein the first comparator connects to the first and second processing nodes to compare whether the results of the first computation performed by the first and second processing nodes are identical, and the second comparator connects to the second and third processing nodes to compare whether results of the second computation performed by the second and third processing nodes are identical.

18 Claims, 8 Drawing Sheets

(56) References Cited

U.S. PATENT DOCUMENTS

| | | | |
|---|---|---|---|
| 6,928,606 B2 | 8/2005 | Lu et al. | |
| 7,206,966 B2 | 4/2007 | Barr et al. | |
| 7,870,439 B2 | 1/2011 | Fujiyama et al. | |
| 7,877,627 B1* | 1/2011 | Freydel | G06F 11/1641 |
| | | | 714/11 |
| 2003/0009637 A1 | 1/2003 | Arimilli et al. | |
| 2008/0244305 A1 | 10/2008 | Fuessl et al. | |
| 2012/0005524 A1 | 1/2012 | Rangaranjan et al. | |
| 2012/0173924 A1 | 7/2012 | Greb et al. | |
| 2012/0210164 A1* | 8/2012 | Gara | G06F 11/165 |
| | | | 714/10 |
| 2013/0138993 A1* | 5/2013 | Franklin | G06F 11/0793 |
| | | | 714/2 |
| 2013/0318535 A1 | 11/2013 | Sun | |
| 2019/0004914 A1* | 1/2019 | Shiozawa | G06F 11/2236 |
| 2020/0192742 A1* | 6/2020 | Boettcher | G06F 9/226 |

FOREIGN PATENT DOCUMENTS

| | | |
|---|---|---|
| TW | 201209709 A | 3/2012 |
| TW | 201216047 A | 4/2012 |
| TW | 201743202 A | 12/2017 |
| TW | 201807581 A | 3/2018 |

OTHER PUBLICATIONS

Drozd et al., "Effectiveness of matrix and pipeline FPGA-based arithmetic components of safety-related Systems" Sep. 2015.

TW Notice of Allowance in Application No. 108144325 dated Dec. 24, 2020.

\* cited by examiner

REDUNDANT PROCESSING NODE CHANGING METHOD AND PROCESSOR CAPABLE OF CHANGING REDUNDANT PROCESSING NODE

CROSS-REFERENCE TO RELATED APPLICATIONS

This non-provisional application claims priority under 35 U.S.C. § 119(a) on Patent Application No(s). 108144325 filed in Taiwan, ROC on Dec. 4, 2019, the entire contents of which are hereby incorporated by reference.

TECHNICAL FIELD

This disclosure relates to redundant computation, and more particularly to a processor capable of performing redundant computation and a verification method with redundant computation.

BACKGROUND

Hardware redundant is a convenient and effective fault-tolerant design with respect to a complicated circuit such as a processor. The aerospace system with a high safety specification may adopt an odd number of redundant processing devices and a majority rule to ensure a correct computation result.

In addition, in the application of self-driving cars, in order to meet the huge amount of operations required by artificial intelligence, a large number of processing nodes are used to implement distributed parallel operations. Under such the structure, it may cause the functional failure of the entire system and further putting passengers in danger as long as one of the plurality of processing nodes outputs an error computation result.

SUMMARY

According to one or more embodiment of this disclosure, a redundant processing node changing method, wherein the method is configured to be adapted to a processor comprising a plurality of processing nodes and a plurality of comparators, and the method comprises: selecting a first node pair from the plurality of processing nodes; setting two processing nodes of the first node pair as a first processing node and a second processing node in a verification procedure and performing the verification procedure; selecting a second node pair from the plurality of processing nodes; and after the verification procedure is performed with the first node pair, setting two processing nodes of the second node pair as the first processing node and the second processing node in the verification procedure and performing the verification procedure; wherein the verification procedure comprises: preforming a computation by the first processing node to generate a first result; preforming the computation by the second processing node to generate a second result; comparing the first result and the second result by a comparator, wherein the comparator is one of the plurality of comparators that connects to the first processing node and the second processing node; outputting an error signal by the comparator when the first result is different from the second result; and outputting the first result or the second result when the first result is identical to the second result.

According to one or more embodiment of this disclosure, a processor capable of changing redundant processing node comprising: a plurality of processing nodes comprising a first processing node, a second processing node, and a third processing node, wherein: the first processing node is configured to perform a first computation; the second processing node is configured to selectively perform the first computation or a second computation; and the third processing node is configured to perform the second computation; and a plurality of comparator comprising a first comparator and a second comparator; wherein: the first comparator connects to the first processing node and the second processing node to compare whether a result of the first computation performed by the first processing node is identical to a result of the first computation performed by the second processing node; and the second comparator connects to the second processing node and the third processing node to compare whether a result of the second computation performed by the second processing node is identical to a result of the second computation performed by the third processing node.

The above description of the content of the present disclosure and the description of the following embodiments are used to demonstrate and explain the spirit and principle of the present disclosure, and provide a further explanation of the scope of the claims of the present disclosure.

DETAILED DESCRIPTION

The features and advantages of the present disclosure are described in detail in the following embodiments which are sufficient for any person skilled in the art to understand the technology of the present disclosure and implement it accordingly. Moreover, any person skilled in the art can easily understand the related purposes and effects of the present disclosure according to the contents disclosed in this specification, the claims, and the drawings. The following embodiments further illustrate the perspectives of the present disclosure in detail, but these embodiments should not be viewed as limitations of the present disclosure. "Connecting" or "Coupling" used in this specification and the claims may refer to any direct or indirect connection. For example, if the description of the specification describes that the first circuit connects to the second circuit, it should be interpreted that the first circuit directly connects to the second circuit, or the first circuit indirectly connects to the second circuit through other circuits or a certain connectional mechanism.

According to the international standard ISO 26262, titled "Road vehicles—Functional safety", the diagnostic coverage may exceed 90% if using a hardware copy and comparing computation results of two identical hardware devices. Moreover, the diagnostic coverage could be higher if the common cause failure can be avoided when using an identical redundancy policy.

Figure 1:
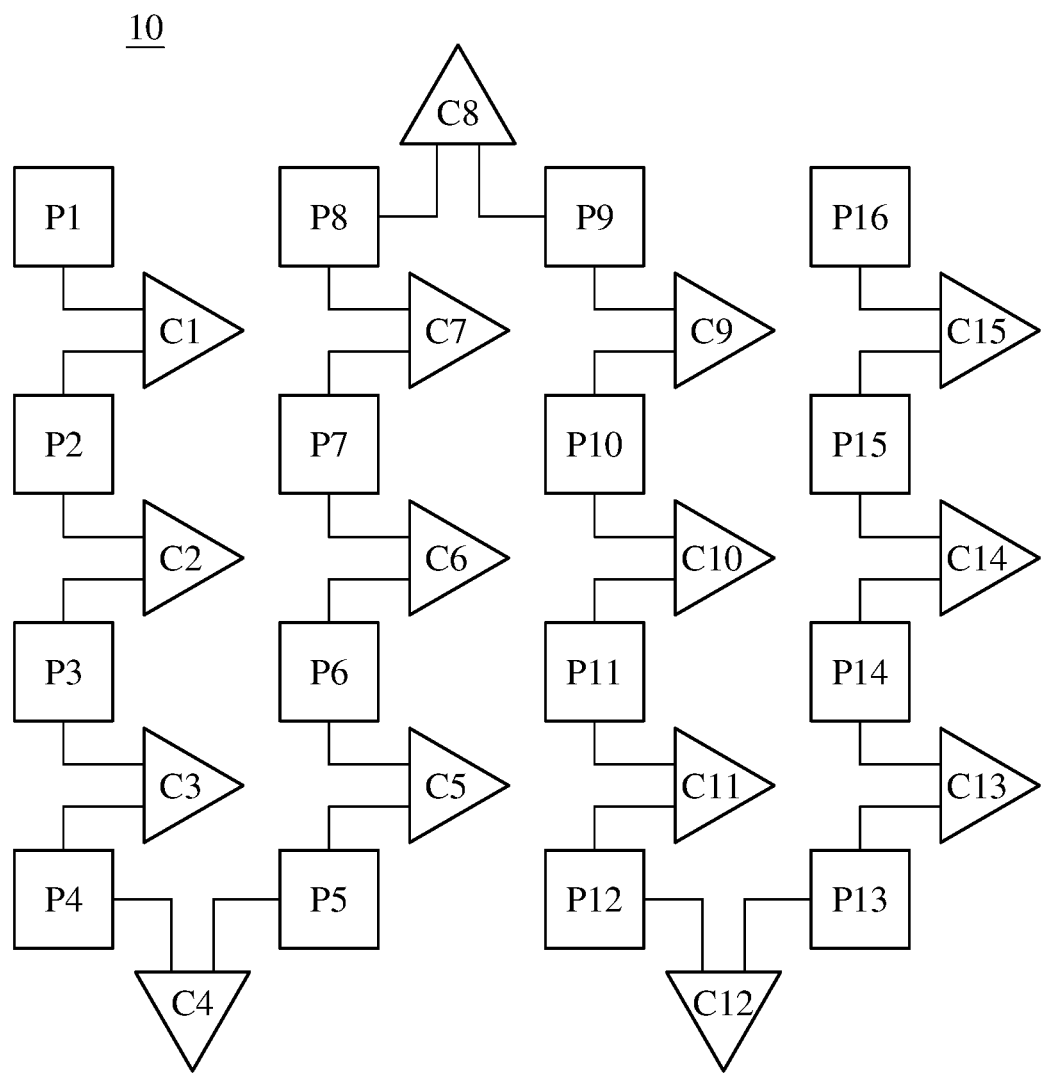
FIG. 1 is an architecture diagram of a processor capable of changing redundant processing node according to an embodiment of the present disclosure.

Please refer to FIG. 1, which illustrates an architecture diagram of the processor 10 capable of changing redundant processing node according to an embodiment of the present disclosure. As shown in FIG. 1, the processor 10 includes 16 processing nodes P1-P16 and 15 comparators C1-C15. Processing nodes P1-P16 are arranged in a form of a matrix of 4 rows by 4 columns. It should be noticed that the present disclosure does not limit the number of rows or the number of columns. In an embodiment, the processor 10 is, for example, a multi-core processor, a vector processor, or a processing unit array. In an embodiment, any two processing nodes of the processor 10 is identical to each other. The processing node is, for example, a Multiply Accumulator (MAC) or a Processing Element (PE). In an embodiment, the processor 10 includes a plurality of processing nodes and a plurality of comparators. The plurality of processing nodes includes a first processing node P1, a second processing node P2, and a third processing node P3 at least. The first processing node P1 is configured to perform a first computation, the second processing node P2 is configured to alternatively perform a first computation and the second computation, and the third processing node P3 is configured to perform the second computation. The plurality of comparators includes a first comparator C1 and a second comparator C2 at least.

Please refer to FIG. 1, the output of each processing node connects to a comparator. For example, the output of the first processing node P1 and the output of the second processing node P2 connect to the first comparator C1. Therefore, when the first processing node P1 and the second processing node P2 respectively perform the first computation, the first comparator C1 may compare whether the output (a result of the first computation) of the first processing node P1 is identical to the output of the second processing node P2. The second comparator C2 connects to the second processing node P2 and the third processing node P3 as shown in FIG. 1. Similarly, when the second processing node P2 and the third processing node P3 respectively perform the second computation, the second comparator C2 may compare whether the output (a result of the second computation) of the second processing node P2 is identical to the output of the third processing node P3. In an embodiment, in accordance with the level of parallelism, one or more redundant processing nodes are selected by software, namely, the processor 10 supports that the level of parallelism is set to 1, and also supports that the level of parallelism is set to greater than 1. The level of parallelism indicates a number of at least one computation performed by one or more redundant processing nodes at a time. For example, the level of parallelism is 2 if some processing nodes of the processor 10 perform the first computation while some other processing nodes of the processor 10 perform the second computation, and each of the remaining processing nodes of the processor 10 performs a computation other than the first and second computations. In an embodiment, the number of comparators of the processor 10, the number of processing nodes of the processor 10, and the connection type of the plurality of processing nodes and the plurality of comparators are associated with the level of parallelism.

Figure 2:
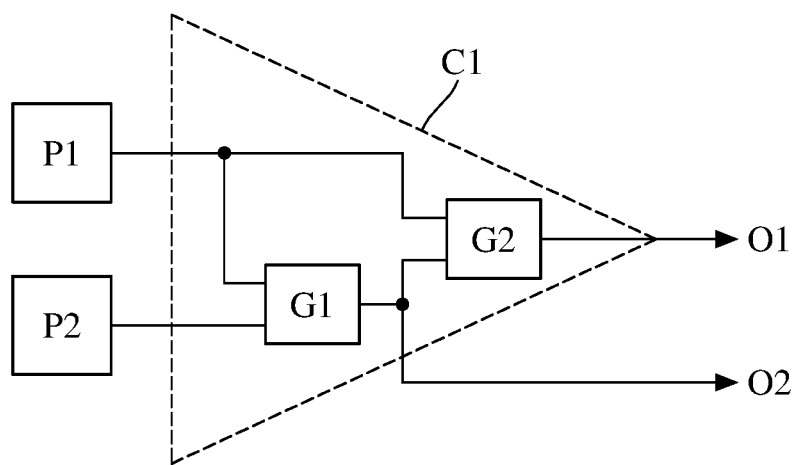
FIG. 2 is an architecture diagram of a comparator according to an embodiment of the present disclosure.

Please refer to FIG. 2, which illustrates an architecture diagram of the comparator according to an embodiment of the present disclosure, wherein the first comparator C1 connecting to the first processing node P1 and the second processing node P2 is served as an example, the architecture and/or function of the comparator connecting to other processing nodes are basically identical to this example. In another embodiment, the architecture and/or function of each comparator may be different.

Please refer to FIG. 2. The first comparator C1 includes two logic circuits G1 and G2 whose connection with respect to the first processing node P1 and the second processing node P2 are shown in FIG. 2. In an embodiment, logic circuits G1 and/or G2 are such as logic gates. In an embodiment, logic circuit G1 and/or G2 are such as exclusive-OR gates (XOR gates). However, the present disclosure does not limit the number and the type of logic gates. In an embodiment, logic circuits G1 and G2 may be integrated into a single logic circuit. The first comparator C1 includes a first output port O1 and a second output port O2. When the first processing node P1 and the second processing node P2 perform the first computation and obtain an identical computation result, this result is outputted by the first output port O1. Otherwise, an error signal is outputted by the second output port O2 for indicating that two different computation results are generated after performing the first computation by the first processing node P1 and the second processing node P2. In an embodiment, the first output port O1 is blocked without outputting the computation result when the first processing node P1 and the second processing node P2 generate different computation results (the second output port O2 outputs the error signal). For example, the first output port O1 outputs a high impedance or a default value such as zero. In another embodiment, when the first processing node P1 and the second processing node P2 generate different computation results, the first output port O1 output one of computation results of two processing nodes, such as the computation result of the first processing node P1, and the second output port O2 outputs the error signal. In addition, the system adopting an embodiment of the processor 10 capable of changing redundant processing node may determine the reaction after receiving the error signal, such as "performing the computation again" to detect whether the temporary error has been eliminated, or resetting all processing nodes of the processor 10 and reloading the computation task to prevent a large scale of temporary hardware error caused by external interference.

In FIG. 2, the first comparator C1 connects to the first processing node P1 and the second processing node P2 and is used as an example for illustration. Therefore, referring to FIG. 1 and this example, the processor 10 may have a second comparator C2 connecting to the second processing node P2 and the third processing node P3, and this comparator C2 is configured to compare results of the second computation performed by the second processing node P2 and the third processing node P3. Moreover, the architecture, function and connection (with processing nodes) of each of the comparators C3-C15 may be deduced according to the above description and will not be repeated here.

In an embodiment, a "distributed arrangement" policy is used in comparators of the processor 10 capable of changing redundant processing node. Specifically, comparators C1-C15 are disposed in adjacent processing nodes separately, and each of the comparators C1-C15 connects to two processing nodes. This embodiment has features such as simple wiring and high scalability.

Figure 3:
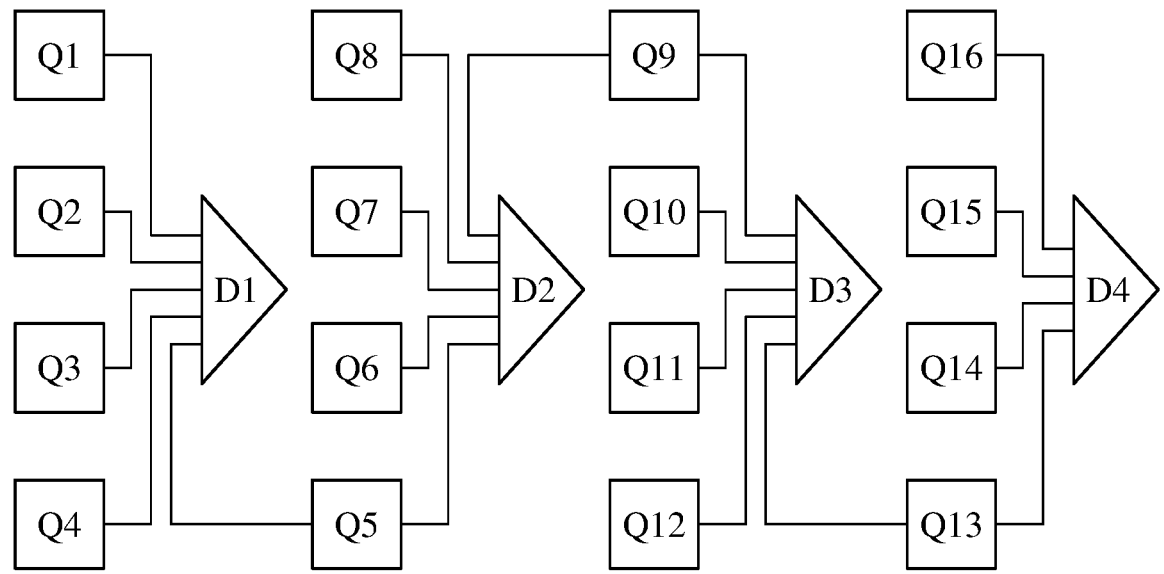
FIG. 3 is an architecture diagram of a processor capable of changing redundant processing node according to an embodiment of the present disclosure.

Please refer to FIG. 3, which illustrates an architecture diagram of the processor 20 capable of changing redundant processing node according to an embodiment of the present disclosure. As shown in FIG. 3, the processor 20 includes 16 processing nodes Q1-Q16 and 4 comparators D1-D4. Processing nodes Q1-Q16 are arranged in a form of a matrix of 4 rows by 4 columns. Each of the comparators D1-D3 connects to 5 processing nodes and the comparator D4 connects to 4 processing nodes. Each of the comparators D1-D3 connects to all processing nodes in a single column (that is, 4 processing nodes in this embodiment) and one processing node in an adjacent column. The comparator D4 connects to all processing nodes in a single column (that is, 4 processing nodes in this embodiment). In another embodiment, if a number of processing nodes is n*m, these processing nodes may be arranged in a form of a matrix of n rows by m columns, and a number of required comparators is m, with one of the m comparators connects to n processing nodes and each of remaining m−1 comparators connects to n+1 processing nodes.

Figure 4:
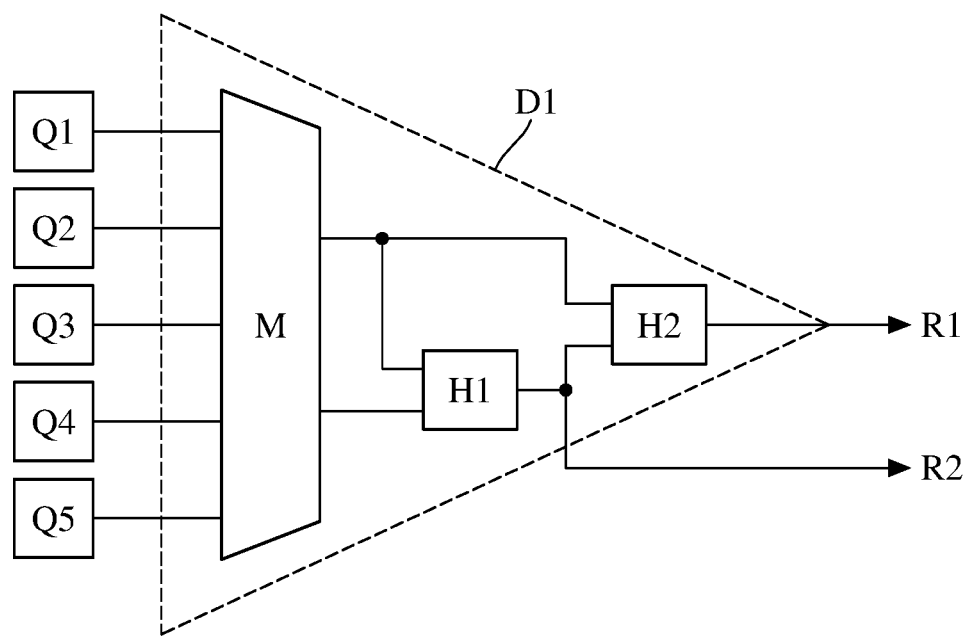
FIG. 4 is an architecture diagram of a comparator according to an embodiment of the present disclosure.

Please refer to FIG. 4, which illustrates an architecture of the comparator according to an embodiment of the present disclosure, wherein the comparator D1 connecting to processing nodes Q1-Q5 is served as an example, an architecture of the comparator connecting to other processing nodes is basically identical to this example. In another example, comparators other than the comparator D1 may have different architectures. Each comparator includes a multiple-to-two multiplexer connecting to more than two processing nodes. In this embodiment, the comparator D1 includes a 5-to-2 multiplexer M and two logic circuits H1, H2. The multiplexer M connects to 5 processing nodes Q1-Q5, wherein two of the processing nodes Q1-Q5 are selected to compare their computation results. The logic circuits H1, H2 are identical or similar to the logic circuits G1, G2 of the first comparator C1. The output ports R1, R2 are identical or similar to the output ports O1, O2 of the first comparator C1. Therefore, details of the logic circuits H1, H2 and the output ports O1, O2 are not repeated here. In another embodiment, the comparator may determine whether computation results of more than two processing nodes are all the same. For example, y computation results generated by y processing nodes are to be determined whether they are all the same, so that logic circuits of the comparator C1 may be modified (in an example, the comparator D1 includes a x-to-y multiplexer M, wherein x and y are positive integers and x>y, and the logic circuits of the comparator D1 may be modified accordingly) to satisfy the following scenario: outputting one of the y computation results when the y computation results are all the same, and outputting an error signal and not outputting any of the y computation results when any one of the y computation results is different from another thereof. In further another embodiment, a majority decision rule is adopted. Specifically, one of the computation results that appears mostly will be outputted when most (a relatively large number) of the y computation results generated by the y processing nodes are all the same, and an error signal will be outputted and the computation result will be blocked when the y computation results are not identical mostly. For example, it is the situation that y equals to 3, the computation result of the processing nodes y1 is identical to the computation result of the processing nodes y2, and the computation result of the processing node y1 is different from the computation result of the processing node y3. In this situation, the computation results of the processing node y1 or y2 will be outputted. However, in another situation that computation results of the processing nodes y1, y2, and y3 are different from each other, an error signal will be outputted and all of the computation results will be blocked.

Figure 5:
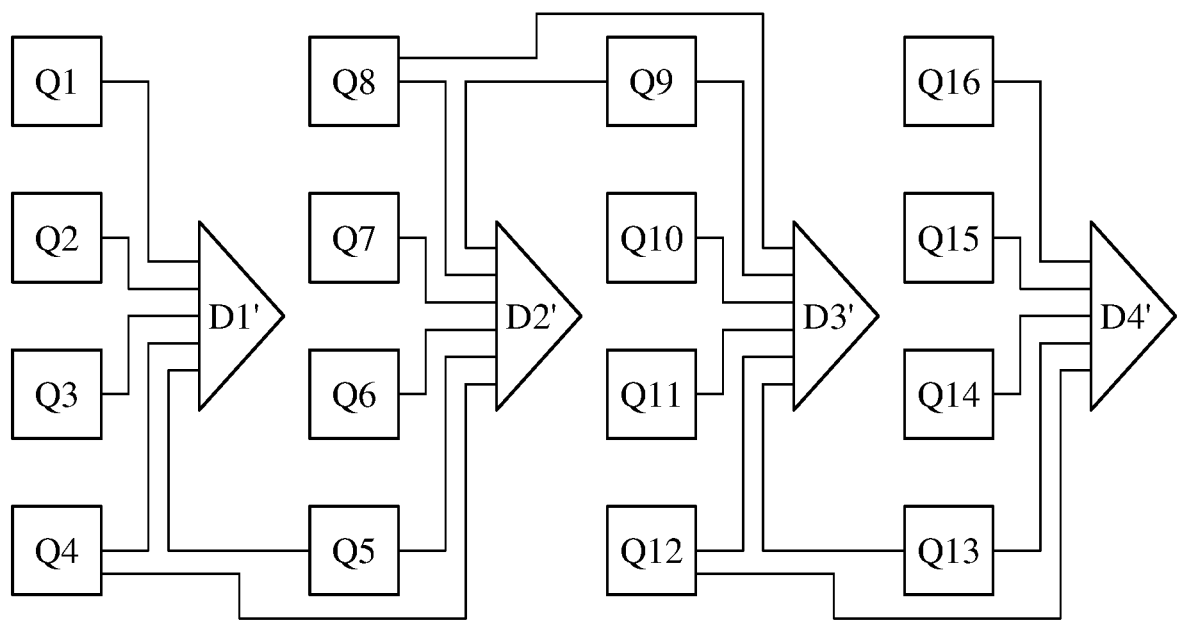
FIG. 5 is an architecture diagram of a processor capable of changing redundant processing node according to an embodiment of the present disclosure.

Please refer to FIG. 5, which illustrates an architecture diagram of the processor 20' capable of changing redundant processing node according to an embodiment of the present disclosure. The processor 20' includes processing nodes Q1-Q16 and comparators D1'-D4'. In this embodiment, each of the comparators D1'-D4' of the processor 20' is able to compare two or more (such as three) computation results. For example, the comparator D1' connects to the processing nodes Q1-Q5, and thus the comparator D1' may determine whether the computation results of processing nodes Q3, Q4, and Q5 are identical or not. The comparator D2' connects to the processing nodes Q5-Q9, and thus the comparator D2' may determine whether the computation results of processing nodes Q4, Q6, and Q5 are identical or not. The processing node Q3 connecting to the comparator D1' is configured to perform the first computation, the processing node Q4 connecting to the comparators D1' and D2' is configured to perform the first computation or a second computation, the processing node Q6 connecting to the comparator D2' is configured to perform the second computation, and the processing node Q5 connecting to the comparators D1' and D2' is configured to perform the computation identical to the computation performed by the processing node Q4. Therefore, the comparator D1' may compare processing results of three processing nodes Q3, Q4, and Q5 when they concurrently perform the first computation (the processing node Q4 is selected to perform the first computation and the processing node Q5 is selected to perform the first computation), and the comparator D2' may compare processing results of three processing nodes Q4, Q6, and Q5 when they concurrently perform the second computation (the processing node Q4 is selected to perform the second computation and the processing node Q5 is selected to perform the second computation). The processor 20' of the above embodiment not only determines computation results of three processing nodes by a single comparator (such as D1' because comparator D1' connects to 5 processing nodes Q1-Q5), but also determines computation results of three other processing nodes (such as Q3-Q5, Q4-Q6) concurrently when changing the comparator D1' to the comparator D2'.

As described above, the processor 20' capable of changing redundant processing node comprises a plurality of processing nodes and a plurality of comparators. The plurality of processing nodes includes a first processing node, a second processing node, a third processing node, and a fourth processing node at least, wherein the first processing node is configured to perform a first computation; the second processing node is configured to selectively perform the first computation or a second computation; the third processing node is configured to perform the second computation; and the fourth processing node is configured to perform a computation identical to the computation performed by the second processing node. The plurality of comparators includes a first comparator and a second comparator at least; wherein the first comparator connects to the first processing node, the second processing node, and the fourth processing node to compare whether a result of the first computation performed by the first processing node, a result of the first computation performed by the second processing node and a result of the first computation performed by the fourth processing node are all identical. The second comparator connects to the second processing node, the third processing node, and the fourth processing node to compare whether a result of the second computation performed by the second processing node, a result of the second computation performed by the third processing node and a result of the second computation performed by the fourth processing node are all identical.

In an embodiment, the comparators D1-D4 of the processor 20 capable of changing redundant processing nodes adopts a "centralized arrangement" policy. The number of processing nodes connecting to a comparator is greater than two for every comparator. Because multiple processing nodes share one comparator, the present disclosure may decrease the number of comparators and save the hardware cost.

In an embodiment, based on a software scheduling, processing nodes P1-P16 of the processor 10 shown in FIG. 1 may perform different computations respectively, or perform two identical computations by two processing nodes (such as P1 and P2) selected from processing nodes P1-P16 and use a comparator (such as C1) connecting to the two selected processing nodes (P1 and P2) to compare whether the two computation results are identical. In other words, computation results of processing nodes may be verified by redundant computation. Moreover, the two selected processing nodes are not always the same. The processor 10 described in this embodiment not only supports selecting processing node by software with the level of parallelism set as 1, but also supports selecting processing node by software with the level of parallelism greater than 1. The detail of the level of parallelism will be described later. The following describes a redundant processing node changing method according to an embodiment of the present disclosure to further explain how to select processing nodes and change redundant processing nodes by software. It should be noticed that the content described in this paragraph is also applicable to other embodiments, such as the processor 20 of FIG. 2.

Figure 6A:
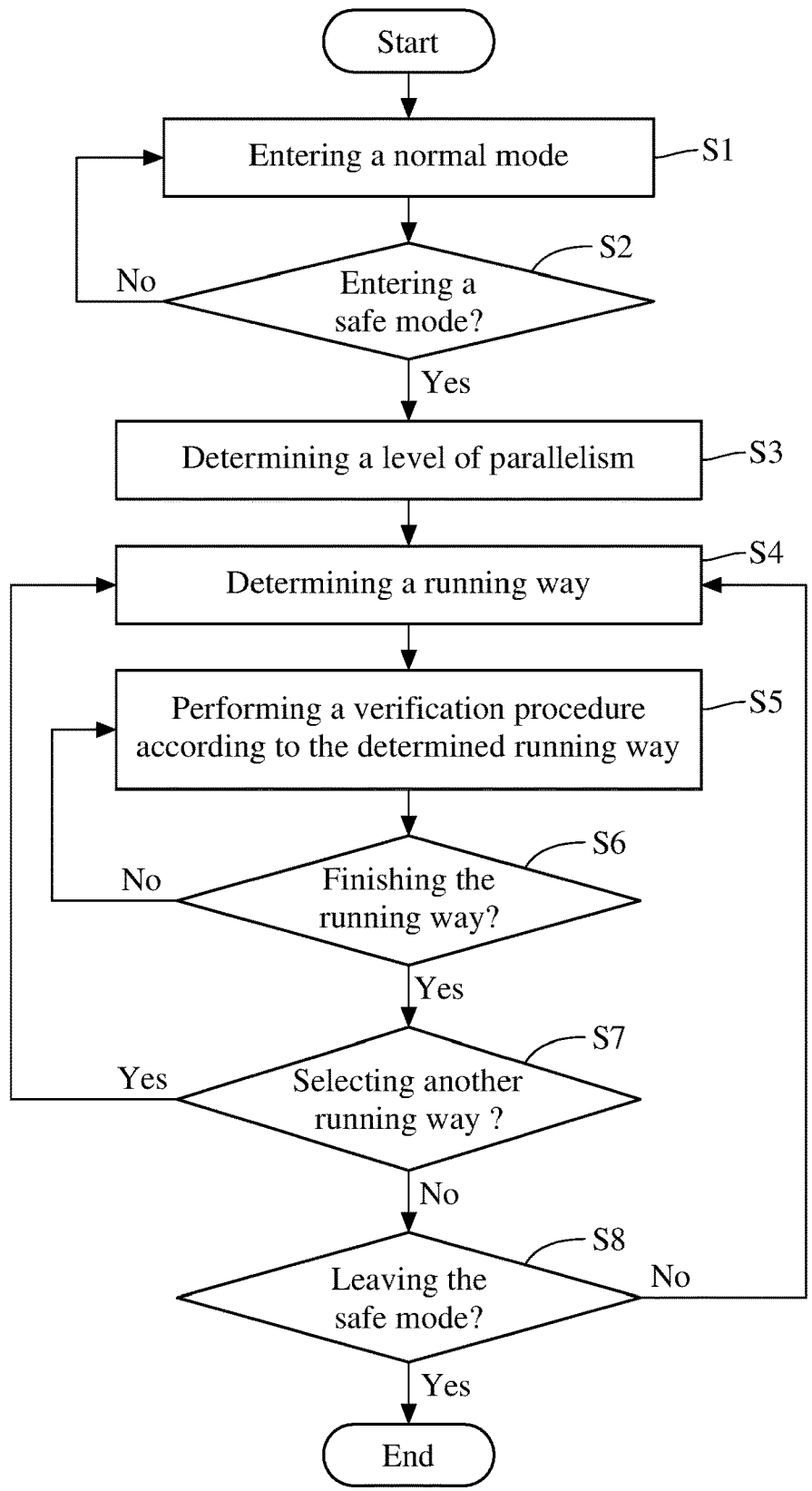
FIGS. 6A, 6B, and 6C are flowcharts of a redundant processing node changing method according to an embodiment of the present disclosure.
Figure 6B:
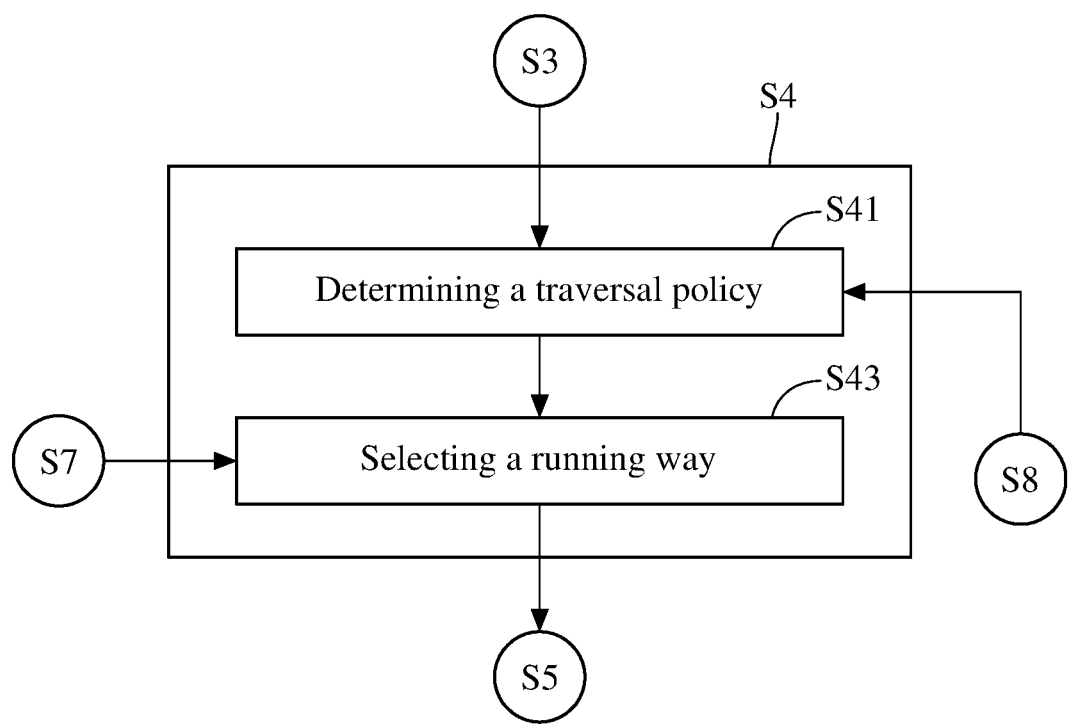
Figure 6C:
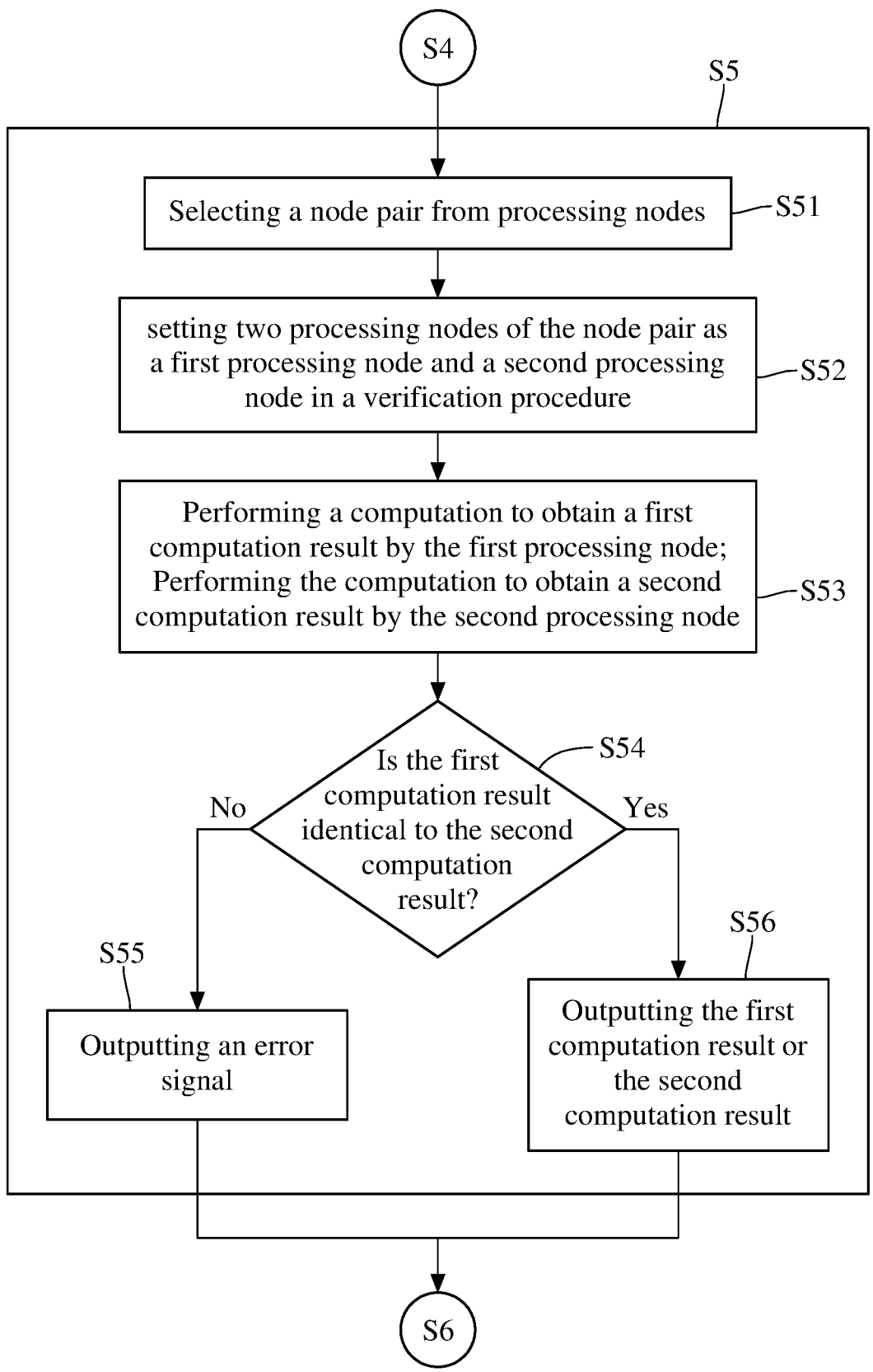
Figure 7:
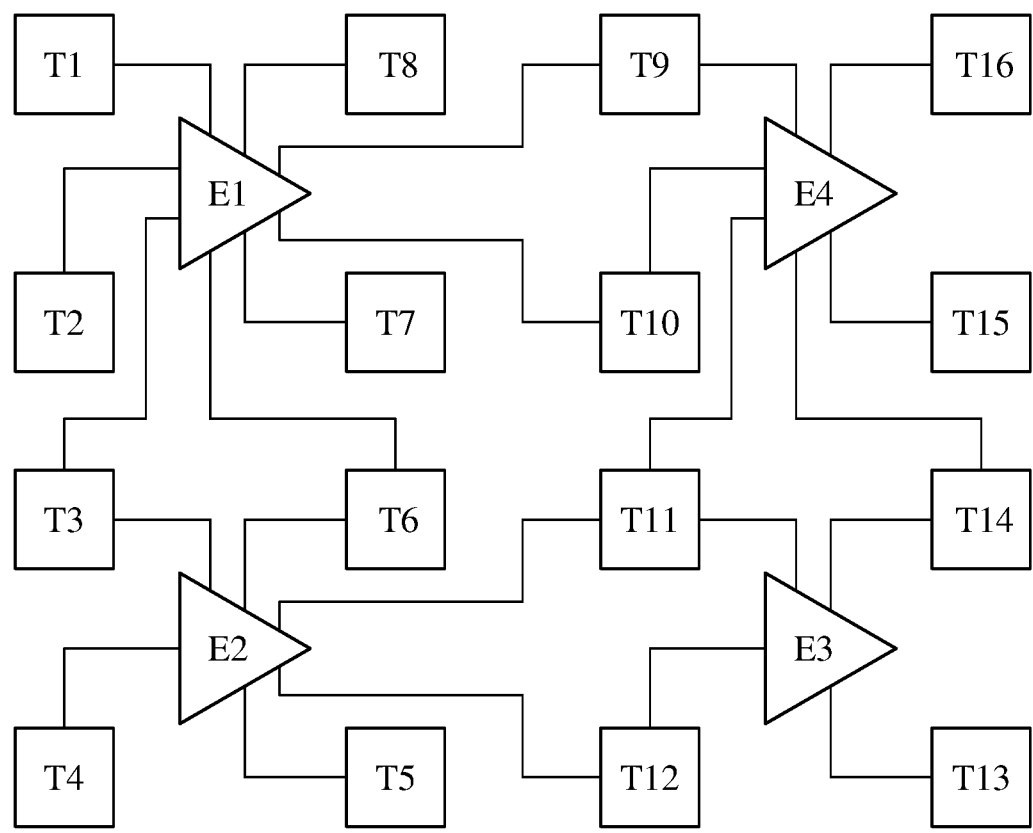
FIG. 7 is an architecture diagram of the processor that performs the method of FIGS. 6A, 6B, and 6C.

Please refer to FIGS. 6A, 6B, and 6C, which illustrate flowcharts of a redundant processing node changing method according to an embodiment of the present disclosure. Please refer to FIG. 7, which illustrates a processor 30 whose comparators conform to a "centralized arrangement" policy, and the redundant processing node changing method shown in FIG. 6A-6C is adapted to the processor 30 illustrated in FIG. 7. The processor 30 includes 16 processing nodes T1-T16 and 4 comparators E1-E4. It should be noticed that steps described in FIG. 6A-6C may be applicable or adaptively modified to apply to the processor 10 shown in FIG. 1 and/or to the processor 20 shown in FIG. 2.

Please refer to step S1, "starting a normal mode". For example, a user activates the processor 30, the powered-on processor 30 may enter the normal mode according to the default setting. In the normal mode, every processing node of T1-T16 may perform computations independently and output the computation results respectively.

Please refer to step S2, which is to determine whether the processor 30 enters a safe mode. In an embodiment, the user may determine whether to switch the processor 30 from the normal mode to the safe mode. In another embodiment, the processor 30 may automatically switch to the safe mode according to the setting or a certain condition. The processor 30 in safe mode may dynamically change redundant processing nodes for performing redundant computations and verifying the computation result.

Please refer to step S3, "determining a level of parallelism". The level of parallelism is a number of node pairs performing redundant computations every time, wherein every node pair includes two or more processing nodes (using 2 processing nodes as an example in the following). For example, "the level of parallelism is k" means that k node pairs (2*k processing nodes) are selected to perform redundant computations every time, and these k node pairs may be viewed as a pair set. In an embodiment, the level of parallelism is associated with a Fault Tolerance Time Interval (FTTI). For smaller FTTI, the tolerance time for detecting a fail processing node is shorter, and thus the level of parallelism may be set as a larger number for decreasing the detection time. In an embodiment, in addition to set the level of parallelism based on FTTI, the computation speed or the clock rate of the processing node are also put into consideration. In this embodiment, "the level of parallelism set as 1" is taken as an example to describe the flow of the redundant processing node changing method according to an embodiment of the present disclosure. The implementation example that "the level of parallelism greater than 1" will be described later.

Please refer to step S4, "determining a running way". The step S5 is performed after the step S4 is finished. In an embodiment, one of multiple running ways is determined by random selection or sequential selection in step S4, and the present disclosure does not limit the selection manner and the number of running ways. The running way is a route along which a verification procedure is performed for a plurality of times. The detail of the verification procedure will be described later. The running way is composed by selected node pairs, the selected node pair includes two processing node and said two processing nodes connect to the same comparator. The running way may traversal every processing node along the row or the column of the matrix shown in FIG. 7. For example, a first running way along the column of the matrix is as follows: (T1, T2), (T2, T3), (T3, T4), (T4, T5), (T5, T6), (T6, T7), . . . , and (T15, T16), wherein (Tx, Ty) represents a node pair consisted of processing nodes Tx and Ty. For example, a second running way along the row of the matrix is as follows: (T1, T8), (T8, T9), (T9, T16), (T16, T15), (T15, T10), . . . , (T13, T12), (T12, T5), and (T5, T4). Regarding the first and second running ways, two processing nodes of a node pair are in a single column or a single row of the matrix. Moreover, two processing nodes of a node pair may also be in two rows and two columns of the sub-matrix in other running way. In other words, two processing nodes of a node pair are two diagonal processing nodes of the sub-matrix. For example, a sub-matrix is consisted of processing nodes T1, T2, T8, and T7 in the matrix shown in FIG. 7. The node pair (T1, T7) or the node pair (T8, T2) has two processing nodes in opposite corners of the sub-matrix. Based on the above example for selecting two processing nodes that are diagonal to each other from a sub-matrix, the third running way along the row of the matrix is as follows: (T1, T7), (T8, T2), (T8, T10), (T9, T7), (T9, T15), (T16, T10), (T2, T6), . . . , and (T14, T12). Based on the above example of selecting two processing nodes that are diagonal to each other from a sub-matrix, the fourth running way along the column of the matrix is as follows: (T1, T7), (T8, T2), (T2, T6), (T7, T3), (T3, T5), (T6, T4), (T8, T10), . . . , and (T14, T12). The present disclosure does not limit the number of running ways. In an embodiment, the node pair selected every time may have more than two processing nodes. For example, the processor 20' shown in FIG. 5 may support a running way consisted of (Q1, Q2, Q3), (Q2, Q3, Q4), (Q3, Q4, Q5), (Q4, Q5, Q6), (Q5, Q6, Q7), . . . , and (Q14, Q15, Q16).

Please refer to FIG. 6B, which illustrates a detailed flowchart of step S4 according to an embodiment of the present disclosure. Please refer to step S41, "determining a traversal policy". In an embodiment, the traversal policy is an order for changing a redundant processing node. The traversal policy is associated with a number of comparators of the processor and a connection type between processing nodes and comparators. In an embodiment, the traversal policy includes a number of running ways and/or an order of running ways. The order of running ways may be determined by user, usage, or specification. The order of running ways may be determined in advance. The order of running ways may be decided by sequentially selecting from the running ways based on a list or by randomly selecting therefrom. The present disclosure does not limit the order of running ways and the number of running ways. The order of running ways may be determined in step S41 or step S43, and the present disclosure does not limit thereto. The traversal policy includes one or more running ways. For example, a first traversal policy has three running ways including the first running way, the second running way and the third running way as describe above and the order of running ways is a sequential selection from these running ways, such as the first running way firstly, the second running way thereafter, and the third running way finally. The second traversal policy has three running ways including the second running way, the third running way, and the fourth running way, and the order of running ways is a random selection from these running ways such as the third running way firstly, the fourth running way thereafter, and the second running way finally.

Please refer to step S43 in FIG. 6B, "selecting a running way". In an embodiment, a running way is selected from a traversal policy determined in step S41, and this selected running way is served as the running way determined in step S4. In step S43, the running way may be selected by user, usage, or specification. The running way may be selected in advance. The running way may be selected in a random order or in a sequential order and the present disclosure does not limit thereto. Step S5 is performed after the step S43 is finished.

Please refer to step S5, "performing a verification procedure according to the determined running way". Please refer to FIG. 6C, which illustrates a detailed flowchart of step S5 according to an embodiment of the present disclosure. Please refer to step S51, "selecting a node pair from processing nodes". Please refer to FIG. 7. In an embodiment, a running way has been already determined in step S4 before a node pair is selected in step S5. Therefore, a node pair may be selected from processing nodes T1-T16 according to the running way determined in step S4 (such as the first running way) in step S5. For example, the selected node pair (which is called a first node pair in the following description) is (T1, T2) when the step S51 is performed for the first time.

Please refer to step S52, which shows setting two processing nodes of the node pair as a first processing node and a second processing node in a verification procedure. For example, the processing node T1 is served as the first processing node in the verification procedure and the processing node T2 is served as the second processing node in the verification procedure. The verification procedure includes steps S53-S56 of FIG. 6C.

Please refer to step S53, which shows the first processing node (T1) performs a computation to obtain a first computation result and the second processing node (T2) performs the computation to obtain a second computation result. In short, both the first processing node and the second processing node perform identical computations. In an embodiment, processing nodes T3-T16 which are not selected in step S53 may perform other computations.

Please refer to step S54, "determining whether the first computation result is identical to the second computation result". In an embodiment, a comparator (E1) connecting to the first processing node (T1) and the second processing node (T2) is used to compare the first computation result and the second computation result. Please refer to step S55, the comparator (E1) outputs an error signal when the first computation result is different from the second computation result. Please refer to step S56, the comparator (E1) outputs the first computation result or the second computation result when the first computation result is identical to the second computation result.

After a verification procedure performed with the first node pair (T1, T2) is finished, the method moves to step S6, determining whether the running way is finished or not. If the determination is negative, step S5 will be performed. For example, step S51 will be performed to select a node pair (T2, T3) that has not performed a computation yet. If the determination is positive, step S7 will be performed. In the situation that the determination is positive, every processing node of the processor 30 may perform computation for once at least (in another embodiment, "almost" every processing node of the processor 30 performs computation for once at least). In this embodiment, the redundant processing node changing method is adapted to a processor with multiple processing nodes and multiple comparators, and said processor is, for example, the processor 30 shown in FIG. 7, which has 3 processing nodes at least. Therefore, after the first node pair (T1, T2) is used to finish step S5 for the first time, the determination of step S6 will be negative when the step S6 is performed for the first time, and thus step S51 will be performed to select a node pair (T2, T3) according to the running way for the second time. The node pair (T2, T3) is called a second node pair, at least one processing node (T3) in the second node pair is different from the two processing nodes (T1, T2) of the first node pair. Further, steps S52-S56 will be performed again. In other words, in the redundant processing node changing method according to an embodiment of the present disclosure, the first node pair (such as (T1, T2)) and the second node pair (such as (T2, T3)) are used successively to perform the verification procedure described in step S5, that is, step S5 is performed twice at least. After step S5 performed with the second node pair is finished, the method moves to step S6. If there are any processing node in the running way that has not performed a computation (which implies that the processor has more than three processing nodes), the method returns to step S5 for selecting the next node pair (such as a third node pair (T3, T4)) to perform the verification procedure. As described above, a running way determined in step S4 may be configured to perform verifications for multiple times (twice at least).

In an embodiment, both the first node pair (T1, T2) and the second node pair (T2, T3) use the same comparator F1 when the step S54 is performed for the first time, the second node pair (T2, T3) and the third node pair (T3, T4) use different comparators when the step S54 is performed for the second time. The second node pair (T2, T3) uses the comparator F1 and the third node pair (T3, T4) uses the comparator F2. In other words, when the redundant processing node is changed according to the running way, the comparator used by the processing nodes of the node pair may be changed selectively according to the change of the node pair.

Please refer to step S7, determining whether to select another running way. The current running way has been finished when the determination of step S6 is positive, and step S7 is for determining whether there is another running way which needs to be performed. In an embodiment, the method will perform step S8 if the determination of step S7 is negative, and the method will perform step S4 if the determination of step S7 is positive. One running way is selected randomly or sequentially from a plurality of running ways when the step S4 is performed. Therefore, when the step S4 is performed again, the running way selected currently may be the same as or different from the running way selected previously, and the present disclosure does not limit thereof. In an embodiment, step S8 will be performed if the determination of step S7 is negative. Otherwise, step S43 will be performed to select a running way if the determination of step S7 is positive, and both the running way selected currently and the running way selected previously belong to the same traversal policy.

Please refer to step S8, determining whether to leave the safe mode. In an embodiment, the redundant processing node changing method according to an embodiment of the present disclosure will be finished if the determination of step S8 is positive, and step S4 will be performed if the determination is negative. In an embodiment, the redundant processing node changing method according to an embodiment of the present disclosure will be finished if the determination of step S8 is positive, and step S41 of FIG. 6B will be performed to determine another traversal policy if the determination of step S8 is negative. In an embodiment, another traversal policy may be determined in step S8. Selecting different traversal policies to perform redundant computations may increase the diversity of node pair selection, and decrease the possibility in selecting two fail processing nodes coincidentally.

Please refer to FIG. 7 and FIG. 6A-6C. If the level of parallelism is set to 2 in step S3, two node pairs will be selected. In an embodiment, in accordance with the level of parallelism, a first pair set will be selected from the plurality of processing nodes. In step S4, an available running way is described as follows: selecting (T1, T8) and (T3, T6) as the first pair set firstly, selecting (T8, T9) and (T6, T11) as a second pair set secondly, and then selecting (T9, T16) and (T11, T14) as the third node pair, . . . , and selecting (T7, T2) and (T5, T4) as a seventh pair set. Each of the number of node pairs of pair sets is identical to the level of parallelism. Specifically, all node pairs of the first pair set perform the verification procedure at a first timing concurrently, namely, processing nodes T1 and T8 perform a first computation and comparator E1 compares computation results of the first computation while processing nodes T3 and T6 perform a second computation and comparator E2 compares computation results of the second computation. All node pairs of the second pair set perform the verification procedure at a second timing concurrently, namely, processing nodes T8 and T9 perform a third computation and comparator E1 compares computation results of the third computation while processing nodes T6 and T11 perform a fourth computation and comparator E2 compares computation results of the fourth computation. All node pairs of the third pair set perform the verification procedure at a third timing concurrently, namely, processing nodes T9 and T16 perform a fifth computation and comparator E4 compares computation results of the fifth computation while processing nodes T11 and T14 perform a sixth computation and comparator E3 compares computation results of the sixth computation. In the same way, the verification procedure is repeatedly performed at fourth, fifth and sixth timings. Finally, all node pairs of the seventh pair set perform the verification procedure at a seventh timing concurrently, namely, processing nodes T7 and T2 perform a 13th computation and comparator E1 compares computation results of the 13th computation while processing nodes T5 and T4 perform a 14th computation and comparator E2 compares computation results of the 14th computation.

Figure 8:
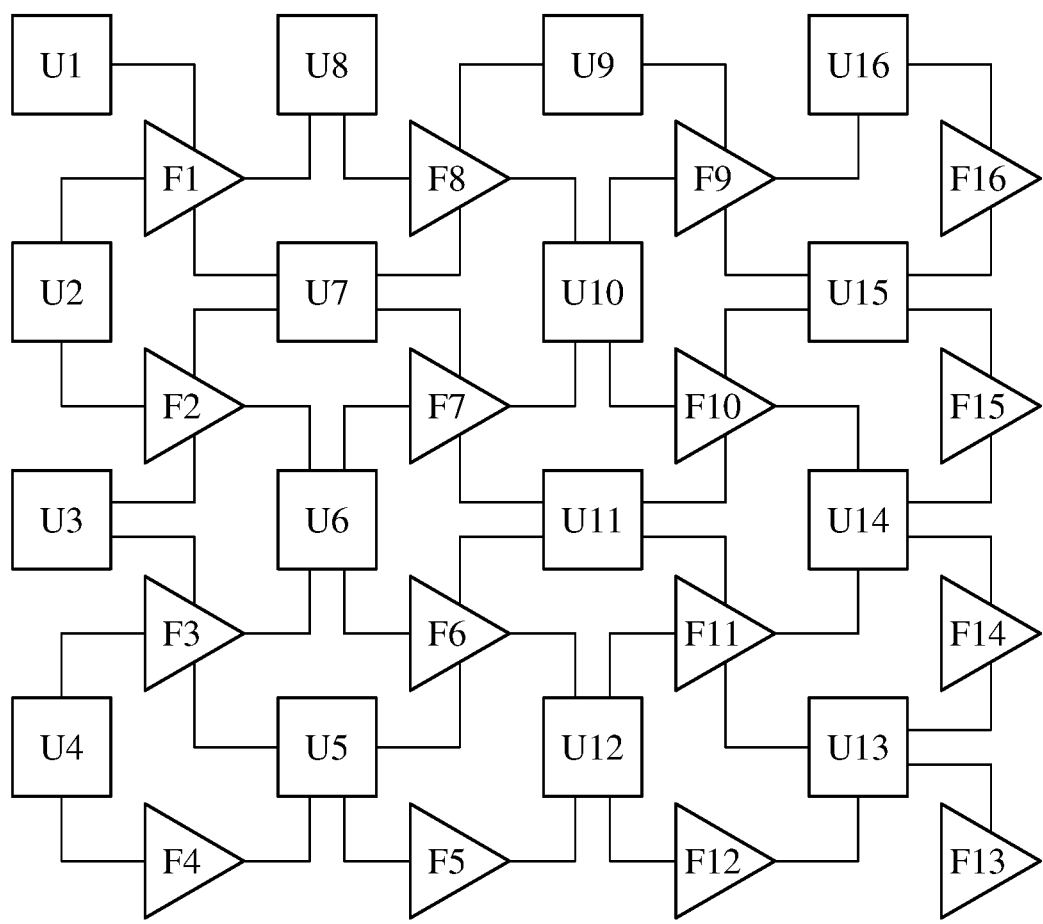
FIG. 8 is an architecture diagram of a processor capable of changing redundant processing node according to an embodiment of the present disclosure.

Please refer to FIG. 8 and FIG. 6A-6C. FIG. 8 illustrates an architecture diagram of the processor 40 capable of changing redundant processing node according to an embodiment of the present disclosure. The processor 40 includes 16 processing nodes U1-U16 and 16 comparators F1-F16. The processor 40 supports the embodiment that the level of parallelism may be set up to 4. For example, the level of parallelism is set to 4 in step S3, which means 4 node pairs will be selected. In step S4, an available running way is described as follows. For example, selecting (U1, U8), (U2, U7), (U3, U6), and (U4, U5) firstly (corresponding to comparators F1, F2, F3, and F4); selecting (U8, U9), (U7, U10), (U6, U11), and (U5, U12) secondly (corresponding to comparators F8, F7, F6, and F5); and selecting (U9, U16), (U10, U15), (U11, U14), and (U12, U13) finally (corresponding to comparators F9, F10, F11, and F12). In the embodiment that the level of parallelism is set to four, it takes only three computation cycles that all processing nodes U1-U16 have performed computation at least once. The user may set a relatively large number to the level of parallelism if the required FTTI is relatively small, and thus those fail processing nodes will be detected earlier and a failure detecting rate may increase. On the other hand, the user may set a relatively small number to the level of parallelism to improve the throughput of the processor.

Please refer to FIG. 8, which illustrates an architecture diagram of a processor capable of changing redundant processing node according to an embodiment of the present disclosure. The previous descriptions of the running way have mentioned that two processing nodes of a node pair may be in two columns and in two rows of a sub-matrix. In an embodiment, said two processing nodes are in opposite corners of the sub-matrix. In the matrix shown in FIG. 8, under the condition that the level of parallelism is set as 1, an available fifth running way is described as follows. The method firstly selects (U1, U7) for computation and uses comparator F1 for comparing the computation results, then selects (U8, U10) for computation and uses comparator F8 for comparing the computation results, and then selects (U9, U15) for computation and uses comparator F9 for comparing the computation results. When a route of the running way meets the edge of the matrix, it may skip the single processing node (such as U16) that cannot be fit into a node pair. Therefore, after the computation is finished with the node pair (U9, U15), the next selected node pairs would be (U2, U6), (U7, U11), (U10, U14), (U3, U5), (U6, U12), and (U11, U13). In an embodiment, processing nodes U4 and U16 are skipped in the fifth running way without performing any redundant computation. The fifth running way is to select two diagonal processing nodes as the node pair and changing the selected node pairs along the row of the matrix. In another embodiment, a sixth running way select another two diagonal processing nodes as a node pair and the route of the sixth running way is along the column of the matrix. The sixth running way is as follows: (U8, U2), (U7, U3), (U6, U4), (U9, U7), (U10, U6), (U11, U5), (U16, U10), (U15, U11), and (U14, U12), wherein processing nodes U1 and U13 are skipped in the running way without performing any redundant computation. In an embodiment that the processor has a large number of processing nodes, the computation power affected due to skipping a few processing nodes may be neglected. In addition, the number of available running ways may increase based on the policies adopted by the fifth and sixth running way. Under the same traversal strategy, the running ways formed by selecting different diagonal processing nodes of the sub-matrix may have complementary characteristics for the skipped processing nodes. For example, the skipped processing node U4 and U16 of the fifth running way are used in the sixth running way, and the skipped processing node U1 and U13 of the sixth running way are used in the fifth running way.

In view of the above, the present disclosure arranges a plurality of comparators to connect processing nodes of the processor. The present disclosure adopts one or more processing nodes to perform redundant computations concurrently according to the level of parallelism depending on a safety requirement, thereby reducing the hardware cost. In addition, a traversal policy may be determined in a software so that the performance of the processor and the diagnostic coverage can be balanced. The processor capable of changing redundant processing node and redundant processing node changing method are cost effective. During the computation progress, the processing node in charge of redundant computation and the processing node under protection may be changed dynamically. Therefore, the diversity of node pair selection may increase and further decrease the possibility of common cause failure.

What is claimed is:

1. A redundant processing node changing method, wherein the method is configured to be adapted to a processor comprising a plurality of processing nodes and a plurality of comparators, the plurality of processing nodes of the processor are arranged in a form of a matrix, and the method comprises:
   selecting a first node pair from the plurality of processing nodes;
   setting two processing nodes of the first node pair as a first processing node and a second processing node in a verification procedure and performing the verification procedure;
   selecting a second node pair from the plurality of processing nodes; and
   after the verification procedure is performed with the first node pair, setting two processing nodes of the second node pair as the first processing node and the second processing node in the verification procedure and performing the verification procedure;
   wherein the verification procedure comprises:
      preforming a computation by the first processing node to generate a first result;
      preforming the computation by the second processing node to generate a second result;
      comparing the first result and the second result by a comparator, wherein the comparator is one of the plurality of comparators that connects to the first processing node and the second processing node;
      outputting an error signal by the comparator when the first result is different from the second result; and
      outputting the first result or the second result when the first result is identical to the second result.

2. The redundant processing node changing method of claim 1, before selecting the first node pair and the second node pair from the plurality of processing nodes, further comprising:
   determining a running way, wherein the running way is a route along which the verification procedure is performed for a plurality of times.

3. The redundant processing node changing method of claim 2, further comprising:
   determining another running way after the plurality of times of the verification procedure is finished.

4. The redundant processing node changing method of claim 1, wherein at least one of the two processing nodes of the second node pair is different from the two processing nodes of the first node pair.

5. The redundant processing node changing method of claim 1, wherein the comparator connecting to the first node pair is identical to the comparator connecting to the second node pair.

6. The redundant processing node changing method of claim 1, wherein the comparator connecting to the first node pair is different from the comparator connecting to the second node pair.

7. The redundant processing node changing method of claim 1, wherein the processing nodes of the first node pair and the second node pair are in a single row or in a single column of the matrix.

8. The redundant processing node changing method of claim 1, wherein the two processing nodes of the first node pair are in two rows and two columns of a sub-matrix, and the two processing nodes of the second node pair are in said two rows and said two columns of the sub-matrix.

9. A redundant processing node changing method, wherein the method is configured to be adapted to a processor comprising a plurality of processing nodes and a plurality of comparators, and the method comprises:
   selecting a first node pair from the plurality of processing nodes;
   setting two processing nodes of the first node pair as a first processing node and a second processing node in a verification procedure and performing the verification procedure;
   selecting a second node pair from the plurality of processing nodes; and
   after the verification procedure is performed with the first node pair, setting two processing nodes of the second node pair as the first processing node and the second processing node in the verification procedure and performing the verification procedure;
   wherein the verification procedure comprises:
      preforming a computation by the first processing node to generate a first result;
      preforming the computation by the second processing node to generate a second result;
      comparing the first result and the second result by a comparator, wherein the comparator is one of the plurality of comparators that connects to the first processing node and the second processing node;
      outputting an error signal by the comparator when the first result is different from the second result; and
      outputting the first result or the second result when the first result is identical to the second result;
   wherein before selecting the first node pair from the plurality of processing nodes, the method further comprises determining a level of parallelism;
   selecting the first node pair from the plurality of processing nodes comprises selecting a first pair set from the plurality of processing nodes according to the level of parallelism, with the first pair set comprising the first node pair;
   performing the verification procedure with the first node pair comprises performing the verification procedure concurrently by every pair of the first pair set;
   selecting the second node pair from the plurality of processing nodes comprises selecting a second pair set from the plurality of processing nodes according to the level of parallelism, with the second pair set comprising the second node pair; and performing the verification procedure with the second node pair comprises performing the verification procedure concurrently by every pair of the second pair set.

10. The redundant processing node changing method of claim 9, wherein both of a number of pairs of the first pair set and a number of pairs of the second pair set equals to the level of parallelism.

11. The redundant processing node changing method of claim 9, wherein the level of parallelism is associated with a fault tolerance time interval.

12. A processor capable of changing redundant processing node comprising:
    a plurality of processing nodes comprising a first processing node, a second processing node, and a third processing node, wherein:
        the first processing node is configured to perform a first computation;
        the second processing node is configured to selectively perform the first computation or a second computation; and
        the third processing node is configured to perform the second computation; and
    a plurality of comparators comprising a first comparator and a second comparator; wherein:
        the first comparator connects to the first processing node and the second processing node to compare whether a result of the first computation performed by the first processing node is identical to a result of the first computation performed by the second processing node; and
        the second comparator connects to the second processing node and the third processing node to compare whether a result of the second computation performed by the second processing node is identical to a result of the second computation performed by the third processing node.

13. The processor capable of changing the redundant processing node of claim 12, wherein the first comparator comprises a first output port and a second output port, the first output port is configured to output the result of the first computation when the results of the first computation performed by the first and second processing nodes are identical, and the second output port is configured to output an error signal when the results of the first computation performed by the first and second processing nodes are different.

14. The processor capable of changing the redundant processing node of claim 13, wherein the first comparator and the second comparator have an identical architecture or an identical function.

15. The processor capable of changing the redundant processing node of claim 12, wherein each of the comparators further comprises a n-to-2 multiplexer, wherein a number of the processing nodes connecting to the n-to-2 multiplexer is greater than two.

16. The processor capable of changing the redundant processing node of claim 12, wherein a number of the plurality of comparators, a number of the plurality of processing nodes, and a connection type of the plurality of processing nodes and the plurality of comparators are associated with a level of parallelism, wherein the level of parallelism indicates a number of at least one computation performed by one or more redundant processing node at a time.

17. The processor capable of changing the redundant processing node of claim 12, wherein a connection type of the plurality of processing nodes and the plurality of comparators is associated with a traversal policy, wherein the traversal policy is configured to change an order of the redundant processing node.

18. The processor capable of changing the redundant processing node of claim 12, wherein
    the plurality of processing nodes further comprises a fourth processing node connecting to the first comparator and the second comparator, and the fourth processing node is configured to perform a computation identical to the computation performed by the second processing node;
    the first comparator is further configured to compare whether the results of the first computation respectively performed by the first processing node, the second processing node, and the fourth processing node are identical; and
    the second comparator is further configured to compare whether the results of the second computation performed by the second processing node, the third processing node, and the fourth processing node are identical.

* * * * *